United States Patent
Hucker

(10) Patent No.: US 10,781,620 B2
(45) Date of Patent: Sep. 22, 2020

(54) SYSTEM FOR MONITORING FUNCTIONS OF A DOOR CLOSER

(71) Applicant: GEZE GmbH, Leonberg (DE)

(72) Inventor: Matthias Hucker, Marxzell (DE)

(73) Assignee: Geze GmbH, Leonberg (DE)

( * ) Notice: Subject to any disclaimer, the term of this patent is extended or adjusted under 35 U.S.C. 154(b) by 181 days.

(21) Appl. No.: 15/796,582

(22) Filed: Oct. 27, 2017

(65) Prior Publication Data

US 2018/0119472 A1 May 3, 2018

(30) Foreign Application Priority Data

Oct. 28, 2016 (DE) .................... 10 2016 221 339

(51) Int. Cl.
*E05F 1/10* (2006.01)
*E05F 15/63* (2015.01)
*G01M 99/00* (2011.01)

(52) U.S. Cl.
CPC ............. *E05F 1/10* (2013.01); *E05F 15/63* (2015.01); *G01M 99/008* (2013.01); *E05Y 2201/624* (2013.01); *E05Y 2201/684* (2013.01); *E05Y 2400/30* (2013.01); *E05Y 2400/32* (2013.01); *E05Y 2400/36* (2013.01); *E05Y 2400/44* (2013.01); *E05Y 2400/52* (2013.01); *E05Y 2400/59* (2013.01); *E05Y 2400/818* (2013.01); *E05Y 2900/134* (2013.01)

(58) Field of Classification Search
CPC ........................... E05Y 2900/132; E05F 15/40
See application file for complete search history.

(56) References Cited

U.S. PATENT DOCUMENTS

| 5,687,451 | A  | * | 11/1997 | Singer | E05F 3/12 16/58 |
| 7,571,515 | B2 | * | 8/2009 | Fischbach | E05F 3/102 16/64 |
| 2009/0000198 | A1 | * | 1/2009 | Brown | E05F 15/53 49/139 |
| 2010/0115853 | A1 | * | 5/2010 | Gebhart | H02P 6/085 49/506 |
| 2010/0214112 | A1 | * | 8/2010 | Ishihara | B60R 25/246 340/686.1 |

(Continued)

FOREIGN PATENT DOCUMENTS

| DE | 102011055491 A1 | 5/2013 |
| WO | 2015175614 A1 | 11/2015 |

OTHER PUBLICATIONS

German Office Action issued in connection with application No. 102016221339.3 dated Jul. 19, 2018.

*Primary Examiner* — Hongmin Fan
(74) *Attorney, Agent, or Firm* — Steven M. Shape; Dennemeyer & Associates, LLC

(57) ABSTRACT

A system for monitoring safety-relevant functions of a door closer for the leaf of a door being used in particular as a fire protection barrier, of a window, or the like comprises a sensor system associated with the door closer for detecting predefinable operating variables of the door closer and a control and/or evaluation device connected to the sensor system for monitoring compliance with predefinable safety functions of the door closer on the basis of the operating variables detected by the sensor system.

25 Claims, 1 Drawing Sheet

(56) References Cited

U.S. PATENT DOCUMENTS

Figure 1:
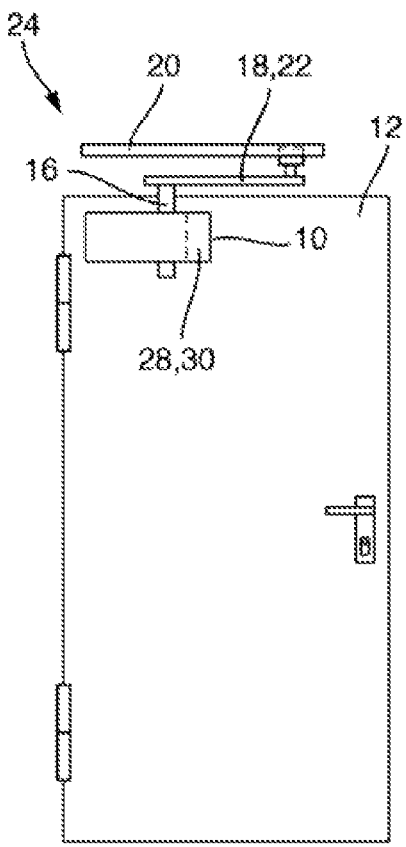

| | | | |
|---|---|---|---|
| 2010/0242368 A1* | 9/2010 | Yulkowski | E05F 15/50 49/349 |
| 2011/0016971 A1* | 1/2011 | Yulkowski | G08B 21/043 73/493 |
| 2013/0186001 A1 | 7/2013 | Burwell | |
| 2014/0182206 A1 | 7/2014 | Yulkowski et al. | |
| 2016/0024831 A1* | 1/2016 | Houser | E05F 15/611 49/29 |
| 2016/0306062 A1* | 10/2016 | Keene | G01R 33/288 |

* cited by examiner

SYSTEM FOR MONITORING FUNCTIONS OF A DOOR CLOSER

The invention relates to a system for monitoring safety-relevant functions of a door closer for the leaf of a door being used in particular as a fire protection barrier, of a window, or the like.

Door closers for doors or windows are well known and can be designed with hydraulic and/or generator-driven damping. In a known manner, a door closer of this kind generally comprises a housing, in which a working piston is displaceably guided and interacts with an output shaft in terms of transmission. A rod assembly or a sliding arm can be arranged non-rotatably on the output shaft. The door closer can optionally be arranged on a leaf of the door or of the window or on a fixed framing. Accordingly, the rod assembly or the sliding arm is supported on the frame or the leaf, as a result of which a connection between the pivoting motion of the leaf and the door closer is established. In particular in the case of floor springs, the output shaft of the door closer can also be directly coupled to the axis of rotation of a rotary leaf.

Door closers are often also mounted on fire protection barriers, such as fire doors or smoke protection doors so that in the event of a fire the fire protection barrier in question or a fire door is securely closed such that the spreading of smoke or fire is prevented. The door closers generally comprise a mechanical accumulator, which is loaded as the leaf is opened and unloads to close the leaf. Here, the closing speed can be hydraulically damped by way of example. The closing speed is usually set via hydraulic valves, and the closing moment is usually set via a pre-loading of the mechanical energy accumulator, which, for example, comprises a spring unit. Door closers are often autonomous systems, which do not require any external energy. In specific cases, a generator-driven damping of the closing speed can also be provided.

Door closers for fire doors or smoke protection doors are subject to high safety requirements, which are defined for the most part in norms and standards. For various reasons, however, one or other of these safety requirements might cease to be met over the course of the service life of the door closer. In cold conditions, for example, the viscosity of the oil generally used as damping medium reduces, thus resulting in an extension of the closing time accordingly. In warm conditions the reverse effect is encountered. If the door closer or the door closer damping medium loses oil, the associated leaf will close at least partially undamped. If toothing is provided and if, by way of example, this toothing or the fitting breaks, the door closer will no longer close at all. For example, in hotels, inter alia, it is also observed that levers associated with a door closer can be detached by the guests, which means that the door closer in question loses its function. Door leaves on fire doors may also be held in the open position for example using a rod or wooden wedge, which means that the door remains open in the event of a fire. In addition, a spring fracture, an adjustment of the bias of the spring, friction or the like can result in a lack of closing moment.

The problem addressed by the present invention is that of providing a system for monitoring safety-relevant functions of a door closer for the leaf of a door being used in particular as a fire protection barrier, of a window, or the like, with which the aforementioned problem is overcome. Here, in particular, the most comprehensive and reliable monitoring possible of the relevant safety functions of the door closer should be ensured.

The problem is addressed according to the invention by a system having the features of claim 1. Preferred embodiments of the system according to the invention result from the dependent claims, the present description and the drawing.

The system according to the invention for monitoring safety-relevant functions of a door closer for the leaf of a door being used in particular as a fire protection barrier, of a window, or the like comprises a sensor system associated with the door closer for detecting predefinable operating variables of the door closer and a control and/or evaluation device connected to the sensor system for monitoring the compliance of predefinable safety functions of the door closer on the basis of the operating variables detected by the sensor system.

On the basis of this design, an intelligent door closer or system is created, with which a comprehensive reliable monitoring of the relevant safety functions of the door closer is made possible. Here, the operating variables of the door closer detected by the sensor system can be analysed or evaluated by the control and/or evaluation device so as to check whether, and to what extent, predefined safety functions of the door closer are actually satisfied.

Here, the operating variables and/or the monitoring results detected by the sensor system can be preferably recorded, signalled, in particular displayed, and/or provided for retrieval by the control and/or evaluation device.

In particular, maintenance information is advantageously also provided and/or error notifications are advantageously also generated by the control and/or evaluation device according to the monitoring results.

All essential safety functions of the door closer can thus be monitored, and necessary maintenance information and any error notifications issued can thus be provided. The control and/or evaluation device can record everything, for example, with timestamps in a log file or an event protocol file. In addition, compliance with variables required by norms can be monitored.

Advantageously, the system expediently additionally comprises a communications interface for remote diagnostics. The operating variables detected by the sensor system and/or the monitoring results obtained after an evaluation by the control and/or evaluation unit can thus also be collected centrally.

The safety functions of the door closer to be monitored by the control and/or evaluation device can comprise, in particular, a predefinable maximum closing time of the leaf acted on by the door closer. For example, it can thus be monitored whether an opened door is closed within a specific time by the door closer so that the door is transferred in good time into the closed position in the event of a fire.

In addition, the safety functions of the door closer to be monitored by the control and/or evaluation device also comprise in particular a predefinable closing moment and/or a predefinable closing moment profile. It can thus also be monitored, in particular, whether a door closer closes the door with the corresponding closing moment so that the door is reliably closed in the event of a fire. For example, it can thus be monitored whether this is also the case when there is a headwind, friction and/or when there are pressure differences.

Alternatively or additionally, the safety functions of the door closer to be monitored by the control and/or evaluation device can comprise in particular also a predefinable minimum closing time of the leaf acted on by the door closer.

By means of the system according to the invention or the intelligent door closer, it can thus also be checked, in particular, that during normal operation a door does not close too quickly, so that nobody is injured by the closing door leaf.

According to an expedient practical embodiment of the system according to the invention, the control and/or evaluation device comprises a cycle counter for counting the opening and/or closing cycles of the leaf acted on by the door closer. Here, the counting result of a cycle counter of this kind can be used in particular for maintenance purposes.

It is advantageous in particular if the operating variables detected by the sensor system can be continuously analysed at least in part by the control and/or evaluation device. By means of a corresponding continuous evaluation or analysis of the operating variables detected by the sensor system by means of the control and/or evaluation device, the reliability of the monitoring of the safety functions is increased accordingly.

Alternatively or additionally, the control and/or evaluation device and associated sensor system can also be designed to detect the operating time of the door closer. This can be used again in particular for maintenance purposes.

The control and/or evaluation device can comprise at least one microcontroller or the like. The operating variables detected by the sensor system can be evaluated or analysed in this case in particular by the microcontroller.

According to a preferred practical embodiment of the system according to the invention, the sensor system and/or the control and/or the evaluation device is integrated at least in part in the door closer.

It is in particular also advantageous if the sensor system and/or the control and/or the evaluation device is formed at least in part in a modular manner and in particular as a module that can be retrofitted. The sensor system and/or control and/or evaluation device can thus also be retrofitted without difficulty also on a door closer that has already been installed.

The sensor system can comprise in particular at least one or more of the following sensors:
- at least one acceleration sensor for detecting the acceleration of the leaf acted on by the door closer;
- at least one proximity and/or motion sensor, such as, in particular, an active infrared sensor or the like;
- at least one sensor for detecting the time;
- at least one position sensor for detecting the position of the leaf acted on by the door closer;
- at least one speed sensor for detecting the speed of the leaf acted on by the door closer;
- at least one sensor for detecting the closing moment produced by the door closer;
- at least one pressure sensor for detecting the pressure in a damping medium, in particular a hydraulic fluid, contained in the housing of the door closer.

The acceleration sensor can thus be used for example to detect an accelerated movement of a door leaf. An acceleration sensor of this kind, in particular, can be easily provided when fitting the door closer to a door leaf. An active infrared sensor or sensor based on another presence technology can be used, for example, to detect an accelerated movement of the door leaf. A sensor of this kind can be provided, for example, if the door closer is mounted on the door frame. Here, if the door closer is mounted on the hinge side, the door leaf passes through the relevant sensor field. In the case of mounting on the hinge side and opposite hinge side, it must be taken into account that passers-by can also pass through the sensor field.

The sensor for detecting the time can comprise a real-time clock, for example, or can be defined by the clock frequency of the microcontroller.

For example, the absolute position of a door leaf can be detected by means of the position sensor. For example, the position sensor can comprise a potentiometer provided on the output shaft or closer shaft of the door closer, a magnetic distance sensor provided on the piston guided in the housing of the door closer, or the like.

The speed sensor can comprise, for example, a tachogenerator with transmission. The sensor for detecting the closing moment produced by the door closer can comprise, for example, a strain gauge for measuring the spring tension, a strain gauge in a sliding rail guiding a sliding arm coupled to the output shaft of the door closer for measuring the transverse force between the sliding block and the sliding rail, and/or the like. For example, the pressure in a damping medium contained in the housing of the door closer, for example hydraulic oil, can be measured by the pressure sensor.

The operating variables detected by the sensor system can be evaluated or analysed continuously or also only temporarily or periodically by the control and/or evaluation device or the microcontroller.

The control and/or evaluation device is expediently designed to determine the speed of the leaf, and from this the current closing speed of the leaf, by differentiation of the position of the leaf acted on by the door closer detected by the position sensor.

It is in particular also advantageous if the control and/or evaluation device is designed to check whether the detected or determined closing time of the leaf acted on by the door closer lies within a time interval determined by a predefinable minimum closing time and a predefinable maximum closing time.

The control and/or evaluation device is advantageously also designed to count the opening and/or closing cycles of the leaf acted on by the door closer on the basis of the signals delivered by the position sensor.

According to a preferred practical embodiment of the system according to the invention, the control and/or evaluation device is designed to monitor a particular fire protection function and/or the closing speed of the leaf acted on by the door closer on the basis of the signals delivered by the position sensor.

It is also advantageous, in particular, if the control and/or evaluation device is designed to validate the signals delivered from the position sensor by including the signals delivered from the speed sensor and/or from the acceleration sensor.

According to a further expedient practical embodiment of the system according to the invention, the control and/or evaluation device is designed to combine the signals delivered from the position sensor with the sensor signals delivered from the acceleration sensor and/or with the sensor signals delivered from the proximity and/or motion sensor, in particular for identifying a break in the output or closer shaft of the door closer, a break in the door or window fitting, manipulations of the door closer and/or of the fitting, and/or the like.

If the control and/or evaluation device or the microcontroller, for example, does not detect any change in position of the output shaft or closer shaft of the door closer, the connection between door closer and leaf must be interrupted.

According to a further advantageous embodiment of the system according to the invention, the control and/or evaluation device is designed to determine the acceleration of the leaf acted on by the door closer by double differentiation of the position detected by the position sensor and/or by single differentiation of the speed of the leaf acted on by the door closer, said speed being detected by the speed sensor, during the closing motion, so as to obtain from this a measurement for the closing moment. The torque is thus proportional to the product of the inertia of the leaf and the acceleration of the leaf. In particular, a change in the closing moment can thus also be identified by the control and/or evaluation device or the microcontroller.

By means of the sensor for detecting the closing moment produced by the door closer, however, the control and/or evaluation device or the microcontroller can also directly measure the closing moment.

According to a further expedient practical embodiment of the system according to the invention, the control and/or evaluation device is designed to determine the holding time of the leaf in a rest position after an opening motion on the basis of the signals delivered by the sensor for detecting the time, in particular so as to detect a fixing of the leaf in the open position.

If the holding time is too great, it can be assumed that the leaf is fixed, i.e. blocked, in its open position, for example by a wedge, a cord, or the like.

According to a further expedient embodiment of the system according to the invention, the control and/or evaluation device is designed to detect a fixing of the leaf in the open position on the basis of the pressure of a damping medium of the door closer detected by the pressure sensor.

For example, in the case of a hydraulic door closer, the fixing of the leaf in the open position thereof can thus also be identified by means of the pressure sensor, since in this case the hydraulic fluid provided as a damping medium or the like, for example oil, is generally pressureless.

As already mentioned, the result of the cycle counter and the determined operating time can also be used for maintenance purposes.

The door closer can comprise, in particular, a mechanical energy accumulator, such as a spring unit or the like, which is loaded as the leaf is opened and unloaded to close the leaf.

The door closer can be provided with hydraulic and/or generator-driven damping. The power supply of the sensor system and of the control and/or evaluation device or of the microcontroller can be provided by the mains network and/or a primary battery and/or accumulator. As already mentioned, the system according to the invention can be used not only with hydraulically damped door closers, but also with door closers damped in a generator-driven manner. In the case of a door closer damped in a generator-driven manner, the power supply can be provided at least in part also directly or optionally in an accumulator-buffered manner from the generator voltage.

By means of the control and/or evaluation device, all of the information obtained or selectively only some of the obtained information can be recorded. In the event of detected manipulations, errors, an outstanding maintenance issue and/or the like, a notification can be generated. This can implemented, for example, via at least one light-emitting diode and/or a summer in the door closer or also via a radio signal and/or an electrical signal, which for example can be transmitted to a maintenance centre.

As also already mentioned, the door closer monitoring can be integrated or installed at least in part in the door closer or also be embodied as a retrofit module for door closers already installed. According to the invention, an intelligent door closer is thus created. Remote charts are also conceivable, so that data in particular can also be collected centrally.

On the basis of the monitoring according to the invention, a normative regular maintenance of the door closer can be disregarded, and instead maintenance can be performed only as required.

Figure 2:
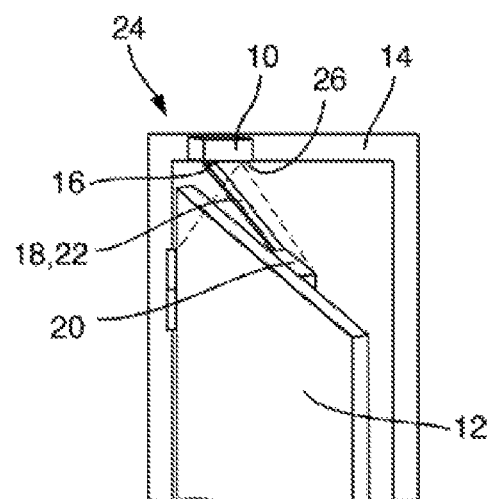
Figure 3:
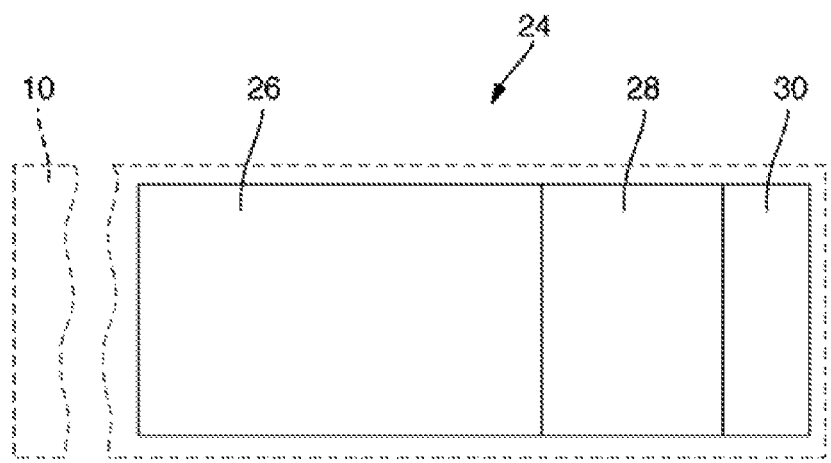

The invention is explained in more detail below on the basis of embodiments with reference to the drawing, in which the following are shown:

FIG. 1 a schematic representation of an exemplary embodiment of a door closer installed on a leaf of a door, the safety-relevant functions of which can be monitored by means of a system according to the invention, FIG. 2 a schematic representation of an exemplary embodiment of a door closer installed on a door frame, the safety-relevant functions of which can be monitored by means of a system according to the invention, and FIG. 3 a schematic representation of the sensor system and/or of the control and/or evaluation device of an exemplary embodiment of the system according to the invention.

FIGS. 1 and 2 each show, purely by way of example, a door closer 10 for a leaf 12 of a door. Here, the door closer according to FIG. 1 is installed on the leaf 12 and according to FIG. 2 is installed on the frame 14 of the door. The door closer 10, however, can also be provided in principle for the leaf of a window, a fire protection cover or smoke protection cover, or the like. The door closer 10 can comprise a mechanical energy accumulator, such as a spring unit, which is loaded as the leaf 12 is opened and unloaded as the leaf 12 is closed. In addition, the door closer 10 can be provided with hydraulic and/or generator-driven damping.

An output shaft 16 rotatably mounted in the housing of the door closer 10 can be connected to a lever arrangement 18 being used for force transmission, which, for example, can comprise a sliding arm 22 guided in a sliding rail 20 (see FIG. 1 in particular) or a rod assembly. In particular, in the case of floor springs, the output shaft 16 of the door closer 10 can also be directly coupled to the axis of rotation of the leaf 12.

The leaf 12 in question can be in particular a fire protection barrier. In the case of a door leaf, it can thus be in particular the leaf 12 of a fire door.

The system according to the invention serves to monitor safety-relevant functions of a door closer 10 for the leaf 12 of a door being used in particular as a fire protection barrier, of a window, or the like. The system according to the invention comprises a sensor system 26 associated with the door closer 10 (see FIG. 3) for detecting predefinable operating variables of the door closer 10 and a control and/or evaluation device 28 connected to the sensor 26 for monitoring the compliance of predefinable safety functions of the door closer 10 on the basis of the operating variables detected by the sensor 26.

The operating variables and/or the monitoring results detected by the sensor system 26 can be in particular recorded, signalled, in particular displayed, and/or provided for retrieval by the control and/or evaluation device 28. Maintenance information in particular can also be provided and/or error notifications in particular can also be generated by the control and/or evaluation device 28 according to the monitoring results.

In addition, the monitoring system 24 can comprise a communications interface 30 (cf. FIG. 3) for remote diagnostics or the like.

The safety functions of the door closer 10 to be monitored by the control and/or evaluation device 28 can comprise, for example, a predefinable maximum closing time of the leaf acted on by the door closer 10, a predefinable closing moment and/or a predefinable closing moment profile, a predefinable minimum closing time of the leaf 12 acted on by the door closer 10, and/or the like.

Alternatively or additionally, the control and/or evaluation device 28, for example, can also comprise a cycle counter for counting the opening and/or closing cycles of the leaf 12 acted on by the door closer 10.

The operating variables detected by the sensor 26 can be continuously analysed or evaluated at least in part by the control and/or evaluation device 28. In principle, however, a merely temporary, for example, periodic analysis or evaluation is also conceivable.

The control and/or evaluation device 28 and associated sensor system 26 can additionally be designed to detect the operating time of the door closer 10. The control and/or evaluation device 28 can comprise at least one microcontroller in particular.

As shown in FIG. 1, the sensor system 26 and/or the control and/or evaluation device 28 can be integrated at least in part in the door closer 10. The sensor system 26 and/or the control and/or evaluation device 28, however, can also be designed at least in part in a modular manner and in particular as a module that can be retrofitted.

The sensor system 26 of the monitoring system 24 according to the invention can comprise in particular at least one or more of the following sensors:
- at least one acceleration sensor for detecting the acceleration of the leaf 12 acted on by the door closer 10;
- at least one proximity and/or motion sensor, such as in particular an active infrared sensor or the like;
- at least one sensor for detecting the time;
- at least one position sensor for detecting the position of the leaf 12 acted on by the door closer 10;
- at least one speed sensor for detecting the speed of the leaf 12 acted on by the door closer 10;
- at least one sensor for detecting the closing moment produced by the door closer 10;
- at least one pressure sensor for detecting the pressure in a damping medium, in particular hydraulic fluid, for example oil, contained in the housing of the door closer 10.

The control and/or evaluation device 28 can be designed to determine the speed of the leaf 12, and from this the current closing speed of the leaf 12, by differentiation of the position of the leaf acted on by the door closer 10 detected by the position sensor.

Alternatively or additionally, the control and/or evaluation device 28 can also be designed to check whether the detected or determined closing time of the leaf 12 acted on by the door closer 10 lies within a time interval determined by a predefinable minimum closing time and a predefinable maximum closing time.

Alternatively or additionally, the control and/or evaluation device 28 can also be designed to count the opening and/or closing cycles of the leaf 12 acted on by the door closer 10 on the basis of the signals delivered by the position sensor.

Alternatively or additionally, the control and/or evaluation device 28 can also be designed to monitor a particular fire protection function and/or the closing speed of the leaf 12 acted on by the door closer 10 on the basis of the signals delivered by the position sensor. In particular, the closing leaf 12 can thus optionally also be braked by the control and/or evaluation device 28.

Alternatively or additionally, the control and/or evaluation device 28 is additionally designed to validate the signals delivered from the position sensor by inclusion of the signals delivered from the speed sensor and/or from the acceleration sensor. The reliability of the monitoring is thus increased accordingly.

In addition, the control and/or evaluation device 28 can be designed in particular to also combine the signals delivered from the position sensor with the sensor signals delivered from the acceleration sensor and/or with the sensor signals delivered from the proximity and/or motion sensor, in particular for identifying a break in an output or closer shaft of the door closer 10, a break in the door or window fitting, manipulations of the door closer 10 and/or of the fitting, and/or the like.

Alternatively or additionally, an embodiment of the control and/or evaluation device 28 in which this device determines the acceleration of the leaf 12 acted on by the door closer 10 by double differentiation of the position detected by the position sensor and/or by single differentiation of the speed of the leaf 12 acted on by the door closer 10 detected by the speed sensor during the closing motion, so as to obtain therefrom a measurement for the closing moment, is also conceivable.

Alternatively or additionally, the control and/or evaluation device 28 is also designed to determine the holding time of the leaf 12 in a rest position after an opening motion on the basis of the signals delivered by the sensor for detecting the time, in particular so as to detect a fixing of the leaf 12 in the open position.

Alternatively or additionally, an embodiment of the control and/or evaluation device 28 in which this device detects a fixing of the leaf 12 in the open position on the basis of the pressure of a damping medium of the door closer 10 detected by the pressure sensor is also conceivable, for example.

As already mentioned, the door closer 10 can comprise, for example, a mechanical energy accumulator, such as a spring unit or the like, which is loaded as the leaf 12 is opened and unloaded to close the leaf 12. The door closer 10 can be provided, for example, with hydraulic and/or generator-driven damping.

The power supply of the monitoring system 24 or of the sensor system 26 and of the control and/or evaluation device 28 can be provided by the mains network and/or a primary battery and/or accumulator. The system 24 according to the invention can be used both with hydraulically damped door closers and with door closers damped in a generator-driven manner. In the case of drives damped in a generator-driven manner, the power supply can be provided at least in part also directly or optionally in an accumulator-buffered manner from the generator voltage. The control and/or evaluation device 28 or the microcontroller can record all of the information or selectively only some of the information. In the event that manipulation, an error, an outstanding maintenance issue and/or the like is determined, the control and/or evaluation device 28 or the microcontroller can generate a corresponding notification. This can be implemented for example via at least one light-emitting diode or a summer in the door closer 10 and/or, for example, also by a radio or electric signal sent to a maintenance centre. For example, remote diagnostics in particular is also possible via the aforementioned communications interface 30. On the basis of the monitoring according to the invention, regular maintenance can be disregarded, and instead maintenance can be performed only as required.

REFERENCE SIGN LIST

10 Door closer
12 Leaf

14 Door frame
16 Output shaft
18 Lever arrangement
20 Sliding rail
22 Sliding arm
24 Monitoring system
26 Sensor system
28 Control and/or evaluation device
30 Communications interface

The invention claimed is:

1. A system (24) for monitoring safety-relevant functions of a door closer (10) for a leaf (12) of a door being used as a fire protection barrier of a window, said system comprising:
   a sensor system (26) associated with the door closer (10) for detecting predefinable operating variables of the door closer (10), the sensor system comprising a pressure sensor configured to detect a pressure of a damping medium contained in a housing of the door closer (10); and
   a control and/or evaluation device (28) connected to the sensor system (26) and configured to monitor compliance with predefinable safety functions of the door closer (10) on a basis of the operating variables detected by the sensor system (26), wherein the control and/or evaluation device (28) is configured to detect a fixing of the leaf (12) in an open position on a basis of the pressure of the damping medium detected by the pressure sensor.

2. The system according to claim 1 wherein at least one of the operating variables or the monitoring results detected by the sensor system (26) can be at least one of recorded, signaled, displayed, or provided for retrieval by the control and/or evaluation device (28).

3. The system according to claim 1 wherein at least one of maintenance information can be provided or error notifications can be generated by the control and/or evaluation device (28) according to the monitoring results.

4. The system according to claim 1 further comprising a communications interface (30) for remote diagnostics.

5. The system according to claim 1 wherein the safety functions of the door closer (10) to be monitored by the control and/or evaluation device (28) comprise a predefinable maximum closing time of the leaf (12) acted on by the door closer (10).

6. The system according to claim 1 wherein the safety functions of the door closer (10) to be monitored by the control and/or evaluation device (28) comprise at least one of a predefinable closing moment and/or or a predefinable closing moment profile.

7. The system according to claim 1 wherein the safety functions of the door closer (10) to be monitored by the control and/or evaluation device (28) comprise a predefinable minimum closing time of the leaf (12) acted on by the door closer (10).

8. The system according to claim 1 wherein the control and/or evaluation device (28) comprises a cycle counter for counting at least one of opening or closing cycles of the leaf (12) acted on by the door closer (10).

9. The system according to claim 1 wherein the operating variables detected by the sensor system (26) are continuously analyzed at least in part by the control and/or evaluation device (28).

10. The system according to claim 1 wherein the control and/or evaluation device (28) and associated sensor system (26) are configured to detect an operating time of the door closer (10).

11. The system according to claim 1 wherein the control and/or evaluation device (28) comprises at least one microcontroller.

12. The system according to claim 1 wherein the sensor system (26) and/or the control and/or evaluation device (28) is integrated at least in part in the door closer (10).

13. The system according to claim 1 wherein at least one of the sensor system (26) or the control and/or evaluation device (28) is configured at least in part in a modular manner as a module that can be retrofitted.

14. The system according to claim 1 wherein the sensor system (26) comprises at least one or more of the following sensors:
   at least one acceleration sensor for detecting the acceleration of the leaf (12) acted on by the door closer (10);
   at least one proximity and/or motion sensor;
   at least one sensor for detecting the time;
   at least one position sensor for detecting the position of the leaf (12) acted on by the door closer (10);
   at least one speed sensor for detecting the speed of the leaf (12) acted on by the door closer (10); or
   at least one sensor for detecting the closing moment produced by the door closer (10).

15. The system according to claim 14 wherein the control and/or evaluation device (28) is configured to determine the speed of the leaf (12), and from the speed of the leaf a current closing speed of the leaf (12) by differentiation of the position of the leaf (12) acted on by the door closer (10), said position being detected by the position sensor.

16. The system according to claim 1 wherein the control and/or evaluation device (28) is configured to check whether the detected or determined closing time of the leaf (12) acted on by the door closer (10) is within a time interval determined by a predefinable minimum closing time and a predefinable maximum closing time.

17. The system according to claim 14 wherein the control and/or evaluation device (28) is configured to count at least one of the opening or closing cycles of the leaf (12) acted on by the door closer (10) on the basis of the signals delivered by the at least one position sensor.

18. The system according to claim 14 wherein the control and/or evaluation device (28) is configured to monitor at least one of a fire protection function or the closing speed of the leaf (12) acted on by the door closer (10) on the basis of the signals delivered by the at least one position sensor.

19. The system according to claim 14 wherein the control and/or evaluation device (28) is configured to validate the signals delivered from the position sensor by including the signals delivered from at least one of the speed sensor or from the at least one acceleration sensor.

20. The system according to claim 14 wherein the control and/or evaluation device (28) is configured to combine the signals delivered from the at least one position sensor with the sensor signals delivered from the at least one acceleration sensor and/or with the sensor signals delivered from the at least one proximity and/or motion sensor, for identifying at least one of a break in an output or closer shaft of the door closer (10), a break in the door or window fitting, or manipulations of at least one of the door closer or the fitting.

21. The system according to claim 14 wherein the control and/or evaluation device (28) is configured to determine the acceleration of the leaf (12) acted on by the door closer (10) by double differentiation of the position detected by the at least one position sensor and/or by single differentiation of the speed of the leaf (12) acted on by the door closer (10), said speed being detected by the at least one speed sensor during the closing motion so as to obtain therefrom a measurement for the closing moment.

22. The system according to claim 14 wherein the control and/or evaluation device (28) is configured to determine the holding time of the leaf (12) in a rest position after an opening motion on the basis of the signals delivered by the at least one sensor for detecting the time, in particular so as to detect a fixing of the leaf (12) in the open position.

23. The system according to claim 1 wherein the door closer (10) comprises a mechanical energy accumulator, loaded as the leaf (12) is opened and unloads to close the leaf (12).

24. The system according to claim 1 wherein the door closer (10) is provided with at least one of a hydraulic or a generator-driven damping.

25. The system according to claim 2 wherein at least one of maintenance information can be provided or error notifications can be generated by the control and/or evaluation device (28) according to the monitoring results.

\* \* \* \* \*